United States Patent [19]

Goshima et al.

[11] 3,718,754

[45] Feb. 27, 1973

[54] VIDEO DISK SIGNAL RECORDING SYSTEM WITH CYCLICAL SPEED CONTROL

[75] Inventors: Takeshi Goshima; Hideaki Sato, both of Ohta-ku, Tokyo, Japan

[73] Assignee: Canon Kabushiki Kaisha, Tokyo, Japan

[22] Filed: Feb. 17, 1971

[21] Appl. No.: 115,999

[30] Foreign Application Priority Data

Feb. 20, 1970 Japan ................................45/15056

[52] U.S. Cl. .........178/6.6 DD, 178/6.6 A, 178/6.6 P, 178/6.6 SF

[51] Int. Cl. ........G11b 5/82, G11b 19/28, H04n 5/78

[58] Field of Search ..........................178/6.6 A, 6.6 P, 6SF, 6.6 DD

[56] References Cited

UNITED STATES PATENTS 3,573,357 4/1971 Toce ...............................178/6.6 SF

OTHER PUBLICATIONS

Lawrence, G. et al. "Time Base Compression for Video Recording" I.B.M. Technical Disclosure Bulletin Vol. 13 No. 4. Sept. 1970.

*Primary Examiner*—Howard W. Britton
*Attorney*—Ward, McElhannon, Brooks & Fitzpatrick

[57] ABSTRACT

The video signals of the first or second field of a desired frame of the television signal may be recorded upon a circular track of an endless magnetic recording medium such as a magnetic recording disk which rotates at high speed in such a way that the starting points of the circular recording tracks may e axially aligned with one another. So a still picture may be reproduced without distortion thereof by reproducing the video signals of one field recorded upon one circular recording track, and further the reversed motion picture may be reproduced by reproducing the video signals in the reversed direction.

10 Claims, 20 Drawing Figures

PATENTED FEB 27 1973

3,718,754

SHEET 2 OF 5

VIDEO DISK SIGNAL RECORDING SYSTEM WITH CYCLICAL SPEED CONTROL

BACKGROUND OF THE INVENTION

The present invention relates generally to a video signal recording and reproducing system, and more particularly to a video signal recording system for recording a television signal upon a magnetic recording medium which rotates at a high speed.

A system is known for recording a television signal upon a magnetic recording such as a disk-shaped recording medium. For example there has been proposed a system in which a magnetic head is disposed in closely spaced relation to a disk-shaped magnetic recording medium, to be referred to as a magnetic recording disk hereinafter, which is rotated at high speed and is displaced radially inwardly, relatively to the head, toward the center of the disk so that the television signal may be recorded upon a spiral track on the magnetic recording disk. Alternatively, the magnetic head is intermittently displaced radially inwardly so that the television signal may be recorded upon circular tracks on the disk. The former method is advantageous for recording the picture or video signal for a relatively shorter time, but is not suitable for lengthy recording so that this recording system is not so advantageous as a video recording system employing a magnetic recording tape. On the other hand, the latter system is suited for recording the video signal which is desired to be reproduced as a still picture. In addition, the moving pictures may also be reproduced for a relatively short time when the magnetic head is continuously displaced radially inwardly or when the magnetic heads, each of which is disposed so as to reproduce the video signal recorded on each track, are sequentially switched from one to another.

However, the system in which the video signals are recorded on the circular tracks on the magnetic recording disk and which may reproduce a still picture has some disadvantages to be described hereinafter as a result of which distortion of the reproduced picture cannot be prevented. To explain the disadvantages of the system, it is assumed that one field of the television signal is recorded on one circular track on the magnetic recording disk. It is also assumed that 525 lines are allocated to each frame and 262.5 lines to each field and that each frame is scanned at a rate of one-thirtieth second on an interlaced scanning basis with the even and odd-numbered lines or fields being scanned at a rate of one-sixtieth second. In this case, the horizontal synchronizing pulses for the second field are lagged by one half of a pulse interval behind those of the first field. In reproduction of a still picture, a satisfactory quality picture may be reproduced from the recorded video signal for the first or second field of each frame because the video signal for the first field is in general not so different from that for the second field. Therefore, the still picture of the desired field may be repetitively reproduced by repetitively reproducing the video signal for this field. However the horizontal sync. pulses are out of phase, as described above, so that the horizontal sync. pulses must be shifted by one half of the pulse interval whenever the desired field has been reproduced and is to be reproduced again so that all of the reproduced pictures of the desired field may be precisely synchronized with each other. However, when the video signal of the desired field is recorded on one circular track on the magnetic recording disk, the sync. pulses in the same phase are reproduced so that horizontal synchronization cannot be attained. As a consequence the reproduced picture is distorted and has an unpleasant quality with poor fidelity.

The above problem will be overcome when both of the first and second fields of each frame are reproduced on each circular recording track of the magnetic recording disk. However, the recording capacity of the recording magnetic disk must be doubled, thus resulting in a large-size magnetic recording disk. As a consequence, the mechanism for rotating the magnetic recording disk becomes more complicated and many other problems will occur.

When the pictures are reproduced from the magnetic recording disk in which the first or second fields of successive frames or suitably selected frames are recorded on the circular tracks of the disk respectively so that the moving pictures may be reproduced for a relatively short time interval, the horizontal sync. pulses or signals in the same phase are reproduced because only the first or second fields are recorded so that horizontal synchronization is not attained between the two successive pictures. As a consequence the reproduced pictures are distorted.

To overcome this problem there has been proposed a system in which the pictures are alternately reproduced through an ultrasonic delay line having a delay time equal to one half of the horizontal sync. pulse interval. In other words, the first field is reproduced directly, the second field through the delay line, the third field directly and so on. However, this system has a distinct disadvantage in that the ultrasonic delay line is extremely expensive.

Another system for overcoming the problem is such that only 262 lines out of the 262.5 lines in each field are recorded on the magnetic recording disk rotating at a constant high angular velocity and a 0.5 line is not recorded. In this case it is assumed that the magnetic recording disk is rotating at such a constant angular velocity that a time for one complete rotation (to be referred to as "a rotational period" hereinafter) may be equal to a duration of scanning only 262 lines out of 262.5 lines for each field. Therefore between the time the scanning of the 262th line of the first field of the first frame has been completed, and the time the scanning of the first line of the first field of the next field is started, the magnetic recording disk will rotate through an angle of 360° plus an angle which is the product of the constant angular velocity of the disk and a time interval between horizontal sync. pulses ( = 2 X time required for scanning a half line in each field). As a consequence the starting point in recording of the second circular track on the disk is angularly displaced from that of the first track by the angle which is the product of the constant angular velocity of the disk and a time interval between horizontal sync. pulses. In a similar manner, the starting points of the third, fourth, fifth circular tracks and so on are angularly displaced from the preceding starting points. Therefore, when it is desired to reproduce reversed motion pictures from the disk, the magnetic head must be angularly displaced backward through said angle each time one circular track has been reproduced while at the same time the magnetic head is moved outwardly to the next circular track. The recording system permitting such dual movements of the magnetic head is very complicated and expensive. If such an arrangement is not made, the vertical and horizontal synchronizations are not attained at all so that the reproduced reversed motion pictures are very distorted.

One of the objects of the present invention is therefore to overcome the problems encountered in the conventional video signal recording systems of the type described.

Another object of the present invention is to provide an improved video signal recording system of the type in which the video signal of the first or second field of a desired frame of the television signal may be recorded upon a circular track of an endless magnetic recording medium such as a magnetic recording disk which rotates at high speed in such a way that the starting points of the circular recording tracks may be aligned axially in case of a drum-shaped magnetic recording medium or radially in case of a magnetic recording disk and that a still picture may be reproduced by reproducing the video signal of one field recorded upon one circular recording track and the reversed motion picture may be reproduced by reproducing the video signals in the reverse direction.

Another object of the present invention is to provide an improved video signal recording system which may record on an endless magnetic recording medium such as a magnetic recording disk a plurality of sampled or gated fields of the television signal in such a way that the video signal of each field may be recorded on one circular track of the recording medium and that the starting points in recording of all fields may be axially or radially aligned with each other.

The above and other objects, features and advantages of the present invention will become more apparent from the description of the preferred illustrative embodiment thereof taken in conjunction with the accompanying drawing.

SUMMARY OF THE INVENTION

In brief, a magnetic video signal recording system in accordance with the present invention is characterized in that each of the gated or sampled first or second fields of the desired frames of the television signal is recorded on each of the circular recording tracks of an endless magnetic recording medium such as a magnetic recording disk and that the relative speed between a magnetic record-reproduce head and the endless magnetic recording medium may be varied during a time interval the magnetic head is displaced from one recording track to another, that is a duration of a not-sampled or not-gated second or first field of each frame so that the starting points in recording of the circular recording tracks on the endless magnetic recording medium may be aligned axially or radially.

DESCRIPTION OF THE PREFERRED EMBODIMENT

Figures 1A, 1B:
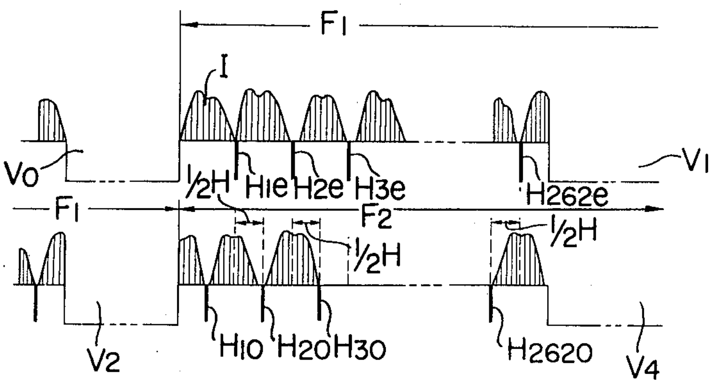
FIGS. 1(A) and 1(B) illustrate the waveforms of the video signals and synchronizing pulses of the typical television signal which is recorded by a video signal recording system in accordance with the present invention.

FIG. 1 shows the waveshapes of the standard television signal including the video signal and sync signals or pulses. FIG. 1A shows that of the odd-numbered frame $F_1$ and FIG. 1B, that of the even-numbered frame $F_2$. One frame of the picture is reproduced by the interlaced scanning of the odd- and even-numbered fields $F_1$ and $F_2$ by a television receiver. In FIGS. 1A and 1B, the television signal is shown as consisting of the video signals I between the horizontal sync pulse $H_{1e}$, $H_{2e}$, $H_{3e}$ and up to $H_{262e}$ and $H_{10}$, $H_{20}$, $H_{30}$ and up to $H_{2620}$ and the vertical sync pulses $V_0$, $V_1$, $V_2$, $V_3$ and $V_4$. In addition to the horizontal and vertical sync pulses and the video signals shown in FIGS. 1A and 1B, the standard television signal which requires 525 lines per frame further contains the equalizing pulses, blanking pulses, etc., which, for clarity, are not shown. The horizontal sync pulses for the even- and odd-numbered fields are separated from each other by H/2, where H is a time interval between the two horizontal sync pulses.

Figure 2A:
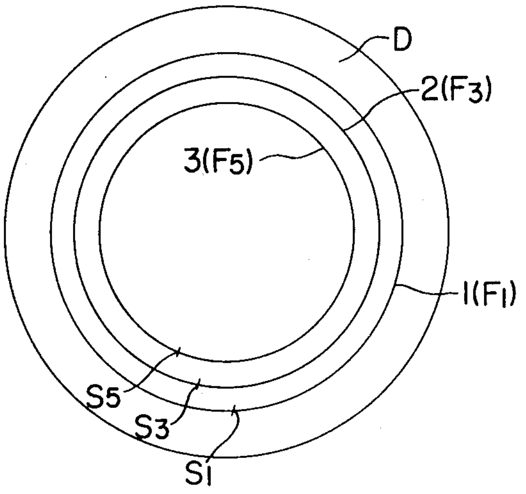
FIG. 2A is a top view of a magnetic recording disk upon which is magnetically recorded the television signal by the conventional video signal recording system.

Next, the method of sampling and recording on a magnetic disk a specified signal, for example the video signal in an odd-numbered field out of the television signal shown in FIG. 1 will be described with reference to FIG. 2A. Upon one rotation of the magnetic recording disk D, a magnetic head (not shown) is displaced by a predetermined distance toward a center of the disk D, thus producing tracks 1, 2 and so on from the outermost track 1 upon which are recorded the video signals in the odd-numbered fields $F_1$, $F_3$, $F_5$ and so on. The starting points $S_1$, $S_2$ and so on of the tracks 1, 2 and so on are angularly displaced from each other, as shown. The reason is that in the conventional recording method, the phase difference component in each field is cut off in recording so as to eliminate the phase difference in horizontal sync pulses between the odd- and even-numbered fields. In other words, the video signals in the odd-numbered fields $F_1$, $F_3$, $F_5$ and so on are not recorded upon the circular tracks of the disk D during a time interval of H/2 just after the 262th horizontal sync pulse $H_{262e}$. In this case the magnetic recording disk D makes one complete rotation during the rotational period of one field duration minus H/2. During the one field duration, the magnetic recording disk therefore rotates through an angle greater than 360° or more precisely an angle of 360° plus an angle which is equal to the product of a constant angular velocity of the disk and the time interval H/2. During the next field duration the magnetic head is moved from the track 1 to the track 2 while the disk D rotates also through an angle greater than 360° or more precisely an angle of 360° plus an angle which is equal to the product of a constant angular velocity of the disk and the time interval H/2. As a consequence, the starting point of the second track 2 of the disk from which point the video signal of the third field $F_3$, that is the first field of the next frame is recorded, is angularly spaced apart from the starting point of the first track 1 through an angle which is equal to the product of the constant angular velocity of the disk $v$ and the time interval H. In a similar manner, as described above, the starting points $S_5$, $S_7$ and so on of the odd-numbered fields are angularly displaced from the preceding starting points through the angle which is equal to the product of the constant angular velocity $v$ and the time interval H. Thus, the starting points $S_1$, $S_3$, $S_5$, $S_7$ and so on are not aligned radially or are not in line with a radius of the disk D as shown in FIG. 2A.

Figure 3:
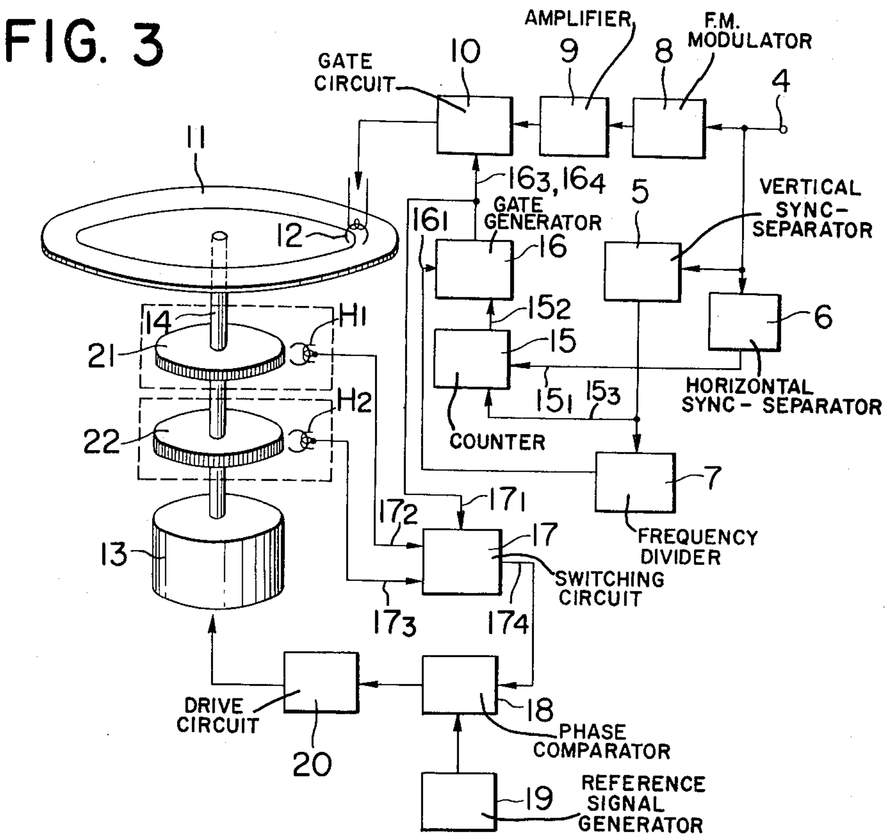
FIG. 3 is a block diagram of one illustrative embodiment of a video signal recording system in accordance with the present invention.
Figures 4, 6:
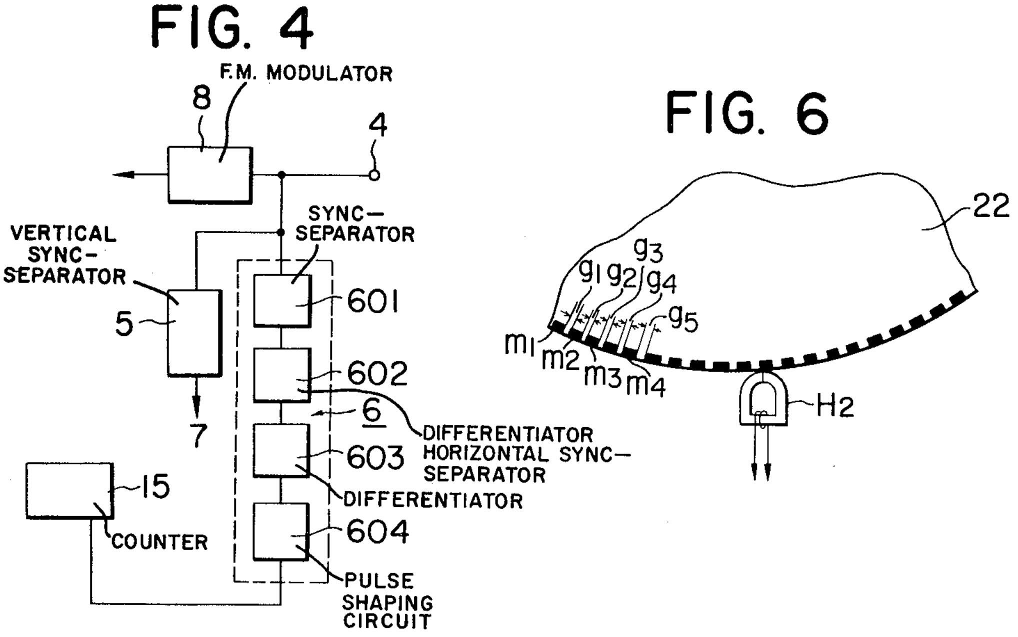
FIG. 4 is a block diagram of a sync-separator circuit thereof.
FIG. 6 is a fragmentary, schematic view illustrating a control signal pulse generating disk and a magnetic head thereof.

Referring to FIG. 3 illustrating the preferred embodiment of the present invention, 4 denotes an input terminal to which is applied the composite television signal consisting of the video signal and sync pulses; 5, a sync-separator circuit for separating the vertical sync pulses from the television signal applied to the input terminal 4, the vertical sync-separator circuit 5 including an integration circuit well known to those skilled in the television art so that no detailed explanation will be given in this specification. 6 denotes a horizontal sync-separator circuit, the detail of which is shown in FIG. 4, and which comprises a sync-separator circuit 601, a monostable multivibrator 602, a differentiating circuit 603 and a monostable multivibrator 604 all of which are widely used in the television art. The monostable multivibrator 602 compensates the delay in transmission of the video signal, as will be described in more detail hereinafter, and prevents change in the phase relation between the horizontal and vertical sync pulses so as to accomplish the phase compensation in such a way that a part of the horizontal sync pulse coincides with a leading or rising or trailing or falling edge of the vertical sync pulse thereby to maintain the normal phase relation between them. Therefore the monostable multivibrator 602 has a time constant for maintaining the normal phase relation between the horizontal and vertical sync pulses as described above. The output of the monostable multivibrator 601 is differentiated by the differentiating circuit 602 and shaped into the pulse wave-form by the monostable multivibrator 604 to generate the horizontal sync pulses. In generating the horizontal sync pulses in the manner described above, the delay in the horizontal sync pulses or the video signal transmission is taken into consideration. Referring back to FIG. 3, 7 denotes a frequency divider of an asynchronous type bistable multivibrator (See FIG. 5, $FF_1$); 8, an FM modulator; 9, a video signal recording amplifier; 10, a gate circuit or transmission gate; 11, a magnetic recording disk; and 12, a magnetic recording head.

Figure 5:
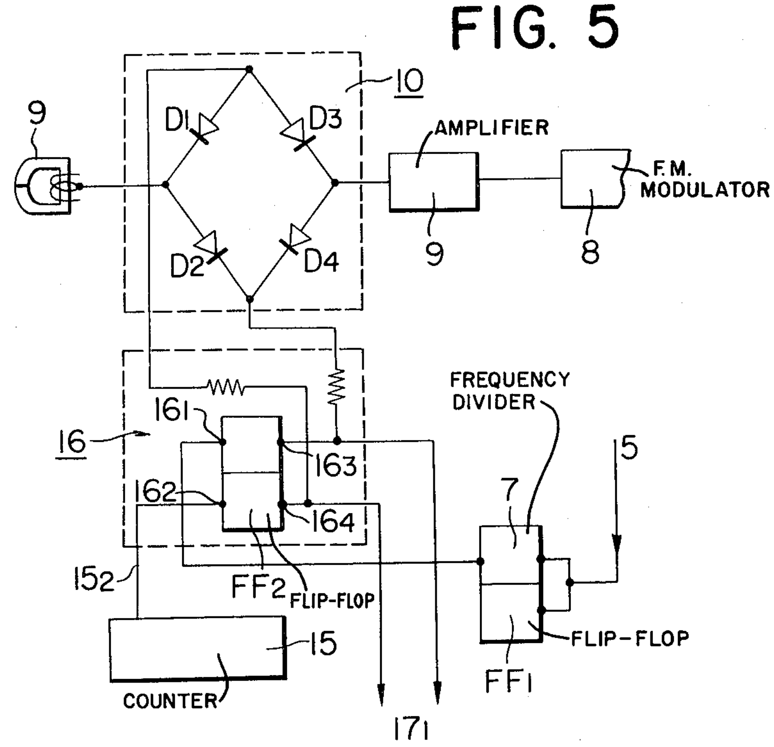
FIG. 5 is a block diagram of a gate circuit and gate generator circuit thereof.

The television signal applied to the input terminal 4 is frequency-modulated by the FM modulator 8, amplified by the amplifier 9 and applied to the magnetic head 12 through the gate circuit 10 so as to be recorded upon the magnetic disk 11, which is driven by a dc motor 13 having a drive shaft 14. A counter 15 counts up to 262 sync pulses applied to its input terminal $15_1$ from the horizontal sync-separator 6 and transmits an output pulse to an output terminal $15_2$ upon counting 262 pulses. A terminal $15_3$ of the counter 15 is a reset signal input terminal which is connected to the frequency divider 7. The detail of a gate signal generating circuit or gate generator 16 for generating a gate signal in response to the output signal from the counter 15 is shown in FIG. 5. The circuit 16 includes a flip-flop $FF_2$ to the reset input terminal $16_2$ to which is applied the output of the counter 15. The output of the frequency divider 7 is applied to the set signal input terminal $16_1$ of the circuit 16.

Figure 7:
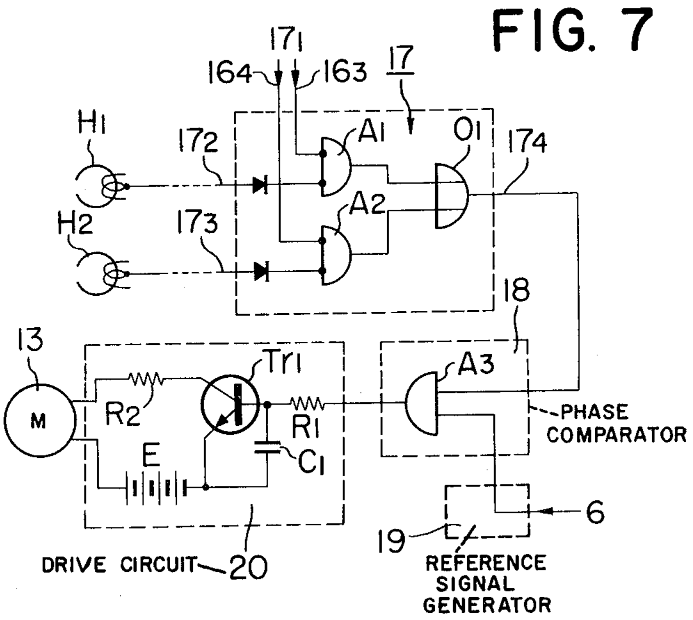
FIG. 7 is a circuit diagram of a switching circuit and a phase comparator circuit thereof.

As shown in FIG. 5 the gate circuit 10 comprises a bridge circuit consisting of diodes $D_1$–$D_4$ and is of an analog gate type. The set and reset output terminals $16_3$ and $16_4$ of the flip-flop $FF_2$ are connected to the opposite terminals of the bridge circuit so that the set output signal from the flip-flop $FF_2$ conducts the diodes $D_1$–$D_4$ from the time the flip-flop $FF_2$ is set by the output from the frequency divider 7 to the time the flip-flop $FF_2$ is reset by the output of the counter 15. Therefore during this time interval the television signal amplified by the amplifier 9 is permitted or gated to be applied across the coil of the magnetic head 12. 17 denotes a switching circuit which selects either of the pulses applied to its input terminals $17_2$ and $17_3$ in response to the control signal from the gate signal generating circuit 16 which is applied to the control signal input terminal $17_1$. The selected pulse signal is derived from the output terminal $17_4$. The details of the switching circuit 17 is shown in FIG. 7. The switching circuit 17 consists of three logic circuits of two AND circuits $A_1$ and $A_2$ and one OR circuit $O_1$. The output terminals $16_3$ and $16_4$ of the flip-flop $FF_2$ in the gate signal generating circuit 16 are connected to the AND gates $A_1$ and $A_2$ respectively. 18 denotes a phase-comparator for comparing the phase of the output of the switching circuit 17 with that of a reference signal generated by a reference signal generating circuit 19. The reference signal generated by the circuit 19 is the same as the horizontal sync pulse in the television signal. It is therefore possible to use the horizontal sync pulses derived from the horizontal synchronizing pulse separator circuit 6 instead of the reference signal generated by the circuit 19. The phase comparator 18 comprises an AND gate $A_3$ (See FIG. 7) which generates an output when both of the outputs from the output terminal $17_4$ of the switching circuit 17 and the reference signal generating circuit 19 are simultaneously applied to the AND circuit $A_3$. When the output from the output terminal $17_4$ of the switching circuit 17 is in phase coincidence with the reference signal from the circuit 19, the output is derived from the AND gate $A_3$. A drive circuit 20 for driving the motor is shown in FIG. 7 in which $R_1$ and $C_1$ constitute an integration circuit; $Tr_1$ is an npn transistor; E, a dc power source; and $R_2$, a resistor for controlling the magnitude of current. Since the integration circuit consisting of the resistor $R_1$ and the capacitor $C_1$ is connected to the output terminal of the AND gate $A_3$, a bias voltage whose level varies in response to the pulse width of the output of the AND gate $A_3$ is applied across the base and emitter of the transistor $Tr_1$ so that the current for driving the dc motor is controlled. As a consequence the rotational speed of the dc motor 13 is controlled.

Disks 21 and 22 carried by the drive shaft 14 of the dc motor 13 coaxially of the magnetic disk 11 are shown in exaggerated form in FIG. 6. Around the periphery of the disk 21 are equiangularly disposed 262 magnets $m_1$, $m_2$ and up to $m_{262}$ and around the periphery of the disk 22 are disposed 263 magnets in non-equiangularly spaced apart relation with each other by spacings $g_1$, $g_2$, $g_3$ and so on. The spacings between the magnets of the disk 22 which correspond to the starting and ending points of the recording tracks on the magnetic disk D are the same as the spacing between the equiangularly spaced-apart magnets on the disk 21. The spacings between the magnets interposed between the starting and ending points of the disk 22 are slightly greater than the spacing between the equiangularly spaced apart magnets on the disk 21. The spacing between the magnets disposed close to the ending point of the disk 22 is smaller than the spacing between the magnets on the disk 21.

Magnetic reproducing heads $H_1$ and $H_2$ are disposed in opposed relation with the peripheries of the disks 21 and 22 respectively and the outputs of the coils of the reproducing heads $H_1$ and $H_2$ are fed to the gate input terminals $17_2$ and $17_3$ of the AND gates $A_1$ and $A_2$ in the switching circuit 17 shown in FIG. 7.

The dc motor 13 is so controlled as to rotate the magnetic disk D through 360° within a time interval H/2 shorter than the duration of each field $F_1$, $F_2$ and so on. That is, the period $T_1$ of the rotation of the dc motor 13 is given by $$T_1 = 1/60 \times 262.0/262.5 \text{ (second)}$$

so that the dc motor 13 rotates at a constant angular speed of $\omega_1 = 2\pi/T_1$ (radian/second). The 263 magnets are disposed around the periphery of the disk 22 in non-uniformly spaced apart relation as described above so that the pulse train from the magnetic head $H_2$ has a period $T_2$ longer than the horizontal sync pulse period by H/2. That is the period $T_2$ of the pulse train is given by $$T_2 = 1/50 \times 263.0/262.5 \text{ (second).}$$

Consequently after the time $T_2$, the angular speed becomes $\omega = 2\pi/T_1$ (radian/second)

The reason why the magnets on the disk 22 are non-uniformly spaced apart from each other is that because the motor 13 has always an inertia it is difficult to rotate the motor 13 at the rotational period $T_2$ immediately after the rotation at the period $T_1$. The spacings between the magnets in the earlier period or section are so determined that the rotation of the motor 13 may be accelerated to a period shorter than the period $T_1$. Toward the period or section close to the ending point, the motor 13 is rotated at the period $T_1$, that is at an angular speed $\omega_2 \leqq \omega_1$.

Figure 10:
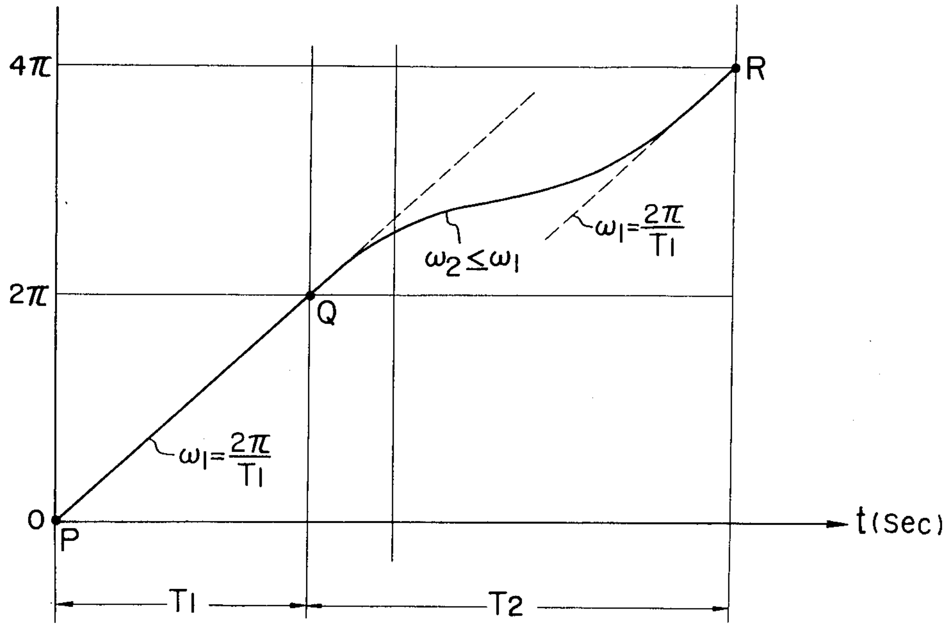
FIG. 10 is a graph illustrating the relation between time and an angle of rotation of a magnetic recording disk used in the system shown in FIG. 3 and driven by a drive motor.

The change in the rotational speed is illustrated in FIG. 10. During the time $T_1$ the angular velocity $\omega_1 = 2\pi/T_1$ is constant as indicated by the straight line PQ, and during the time $T_2$ the angular velocity $\omega_2$ ( $\leqq \omega_1$) varies as indicated by the curved line QR. It is noted that the gradient of the curved line QR at the points Q and R coincides with that of the straight line PQ.

Figures 8A, 8B, 8C, 8D, 8E, 8F, 8G, 8H, 8I:
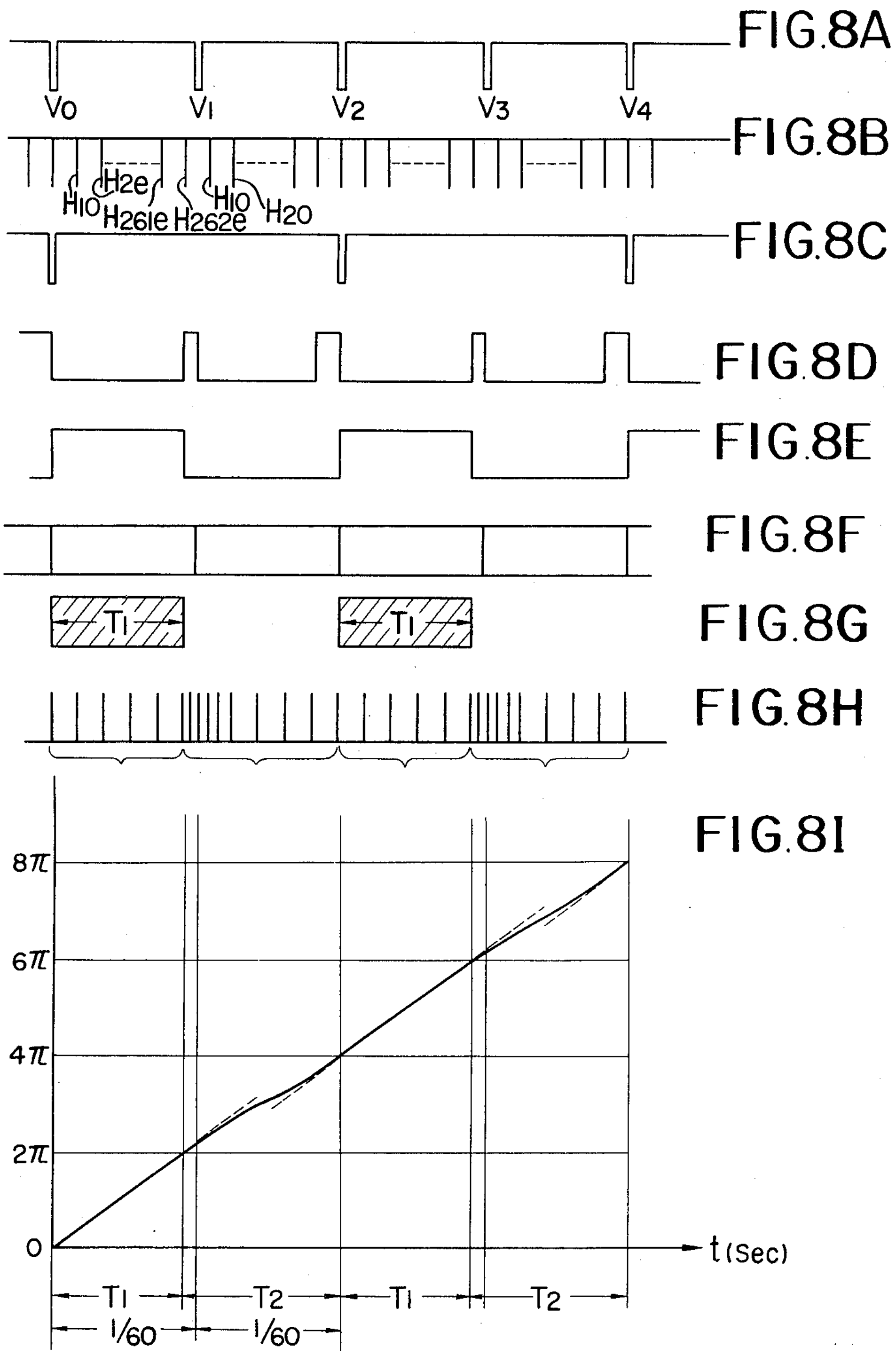
FIGS. 8A to 8I illustrate waveforms produced at various circuits in the video signal recording system shown in FIG. 3.

A drive circuit (not shown) capable of supplying the drive bias current so as to rotate the magnetic disk D at the periods described above is connected in parallel with the drive circuit to the power source for driving the motor 13 so that the motor 13 may be rotated in synchronism with the vertical sync pulses. Therefore the vertical sync pulses in the television signal may be maintained in predetermined phase relation with the signal pulses generated by the magnets as shown by FIGS. 8A and 8H.

Figure 9:
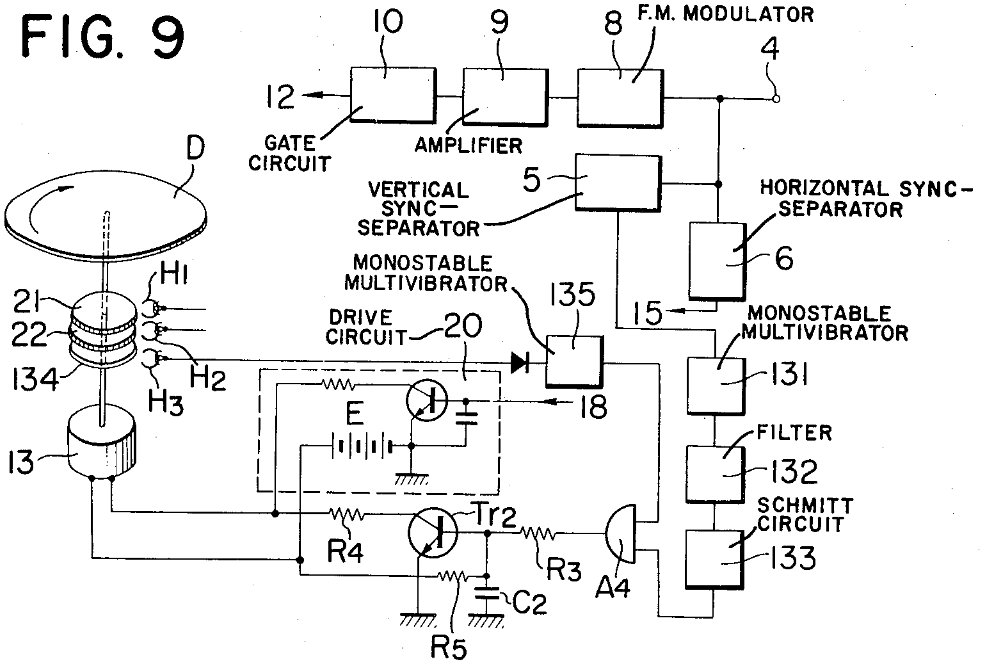
FIG. 9 is a circuit diagram of a phase servo circuit incorporated in the system shown in FIG. 3.

A practical circuit arrangement is shown in FIG. 9 in which the motor 13 is in synchronism with the vertical sync pulses in the television signal. 131 denotes a monostable multivibrator having a time constant (V − H)/2 where $V$ 32 vertical sync pulse period, that is a time interval from the vertical sync pulse $V_1$ of the first field to the vertical sync pulse $V_2$ of the second field. 132 denotes a filter for detection of a reference wave of 60 Hz; 133, a schmitt circuit; $A_4$, an AND gate; 134, a disk carried by the drive shaft 14 of the motor 13 coaxially of the disks 21 and 22 and provided with magnets $134_1$ which are disposed along the arc of 180° of the disk 134 from the point corresponding to the recording starting point on the magnetic disk D; and $H_3$, a magnetic reproducing head which is disposed in opposed relation with the periphery of the disk 134 and whose output is fed to the input terminal of the AND gate $A_4$. The output of the AND gate $A_4$ is integrated by the integration circuit consisting of a capacitor $C_3$ and a resistor $R_3$. $Tr_2$ denotes a transistor; $R_4$, a correction resistor; and $R_5$, a bias resistor for the base of the transistor $Tr_2$.

The collector of the transistor $Tr_2$ is parallel-connected to the output of the drive circuit 20. 135 denotes a monostable multivibrator having a time constant of V−H/2.

The bias is applied to the base of the transistor $Tr_2$ through the resistor $R_5$ so that the transistor $Tr_2$ may feed the predetermined drive current to the motor 13 through the circuit from the power source E → motor 13 → resistor $R_4$ → transistor $Tr_2$ and back to the power source E. When the values of the resistors $R_4$ and $R_5$ are suitably selected, the magnetic disk D may be rotated at the above described period.

The vertical sync pulses of 60 Hz and duty of 50 from the vertical sync-separator circuit 5 are fed to the AND gate $A_4$ through the monostable multivibrator 131, the filter 132 and the schmitt circuit 133. The signal from the head $H_3$ triggers the monostable multivibrator 135 the positive output of which is fed to the input gate terminal of the AND gate $A_4$. On the other hand, the vertical sync pulse is negative as shown in FIG. 1 so that when the output of the monostable multivibrator 135 exactly coincides with the vertical sync pulse, no output is derived from the AND gate $A_4$. The output of the AND gate $A_4$ is a pulse whose width varies depending upon the phase difference between the output from the monostable multivibrator 135 and the vertical sync pulse. The pulse signal from the AND gate $A_4$ is converted by the integration circuit into a voltage having a positive level which depends upon the width of the pulse signal. The positive voltage is applied to the base of the transistor $Tr_2$ so as to vary the collector current.

When there is a phase difference between the sync pulse from the vertical sync-separator circuit 5 and the output from the monostable multivibrator 135 which is triggered by the signal from the head $H_3$, the signal pulse whose width varies depending upon the phase difference is derived from the AND gate $A_4$ and converted into a voltage whose level is varied depending upon the width of the signal pulse by the $C_2$—$R_3$ integration circuit and fed to the base of the transistor $Tr_2$, so that the driving corresponding to the level of the integrated voltage may be fed to the motor 13. As a consequence the rotational speed of the motor may be changed until the output of the monostable multivibrator is in phase coincidence with the vertical sync pulse.

Next referring to FIG. 8 the mode of operation will be described in more detail. The television signal is applied to the input terminal 4 and the horizontal sync pulses are separated from the television signal by the horizontal sync-separator circuit 6 (See FIG. 8B) and applied to the counter 15. The vertical sync pulses (See FIG. 8A) are separated from the television signal by the horizontal sync-separator circuit 5 and applied to the frequency divider 7 so that the flip-flop $FF_1$ in the frequency divider 7 is set by the vertical sync pulse $v_o$ of the field prior to the first field $F_1$. By the next vertical sync pulse $V_1$, the flip-flop $FF_1$ is reset so that the output waveform shown in FIG. 8E is derived from the frequency divider 7. The output of the frequency divider 7 is applied to the gate signal generating circuit 16 so that the flip-flop (See FIG. 5) in the circuit 16 is set during the first field $F_1$ and the set output of the flip-flop $FF_2$ conducts the gate circuit 10. As a consequence the video signal in the television signal is frequency-modulated by the modulator 8 and amplified by the video amplifier 9 and applied to the record-reproduce head 12 through the gate circuit 10 so that the first field (See FIG. 8, F and G) is recorded on the circular recording track on the magnetic disk 11. During this recording the counter 15 counts the horizontal sync pulses.

Figure 2B:
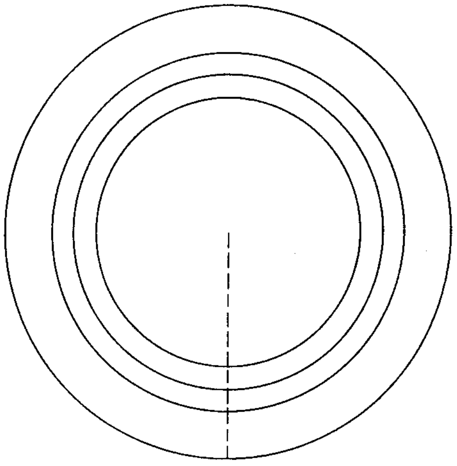
FIG. 2B is a top view of a magnetic recording disk upon which is magnetically recorded the television signal by the video signal recording system in accordance with the present invention.

Both of the outputs from the output terminals $16_3$ and $16_4$ of the gate signal generating circuit 16 are simultaneously applied to the AND gates $A_1$ and $A_2$ in the circuit 17. When the flip-flop $FF_2$ in the circuit 16 is set, the output from the output terminal $16_3$ is applied to the AND gate $A_1$ so that the output from the head $H_1$ appears at the output terminal $17_4$ of the switching circuit 17 and is applied to the phase comparator 18. The output of the head $H_1$ is shorter than the reference signal by one half of the horizontal sync pulse period so that the motor 13 rotates at the period $T_1$. Therefore the magnetic pattern is formed by the television signal in the first field upon the magnetic disk during the time $T_1$ as shown in FIG. 2B. It is seen that the starting and ending points of the magnetic pattern almost coincide with each other. The signal recorded on the circular track of the magnetic disk contains the video signals of 262 (odd-numbered) lines.

Before the signal of the second field is applied to the terminal 4, the output from the output terminal $15_2$ of the counter 15 which has counted 262 horizontal sync pulses is applied to the gate signal generating circuit 16 to thereby reset it. The reset output of the circuit 16 is applied to the input terminal of the switching circuit 17 from the reset output terminal $16_4$ of the flip-flop $FF_2$ in the circuit 16 (See FIG. 5). The reset output is applied to the AND gate $A_2$ in the switching circuit 17 so that the output of the magnetic head $H_2$ is derived from the output terminal $17_4$ of the switching circuit 17. In this case, no output signal is applied from the circuit 16 to the AND gate $A_1$ so that the output of the magnetic head $H_1$ is not derived. (See FIG. 8H).

Because of the arrangement of the magnets on the disk 22 described above, the positions of the pulses from the head $H_2$ are varied as shown in FIG. 8H. It should be noted that the number of pulses shown in FIG. 8H is smaller than the actual number for clarity but in practice 262 and 263 pulses are generated from the magnetic heads $H_1$ and $H_2$, respectively.

The output of the switching circuit 17 is compared with the reference signal by the comparator 18 which corresponds to the vertical sync pulse. The spacing between the magnets of the disk 22 is greater than the spacing between the magnets on the disk 21 in the earlier stage or period of the second field so that there is a phase difference between them. Therefore the motor 13 is rotated by the drive circuit at a period longer than the period $T_1$ at the earlier stage or period of the second field, at a period shorter than the period $T_1$ at the middle stage or period and at the period $T_1$ at the end. As a consequence the magnetic disk D is rotated at the period $T_2$ ($>T_1$). In other words, during the second field the magnetic disk D rotates slower than the speed in case of the recording of the first field. However, the television signal is interrupted by the gate circuit 10 because the counter 15 remains in the reset state. While the magnetic disk 11 makes one rotation, the magnetic head 12 is displaced radially inwardly to the next recording track.

Upon termination of each field duration or period, the vertical sync pulse is separated by the vertical sync-separator circuit 5, stepped down in frequency by the frequency divider 7 and applied to the counter 15 so as to set it again. Therefore the counting of horizontal sync pulses in the third field is started by the counter 15. Since the magnetic head 12 is displaced to the next recording track during the second field duration or period, the television signal in the third field is recorded upon the magnetic disk 11 by the magnetic head 12.

During the second field duration, the magnetic disk 11 rotates at a reduced speed of $T_2$ which is longer than the period $T_1$ by one half of the horizontal sync pulse interval so that the starting point of the third field coincides with the starting point of the first field as shown in FIG. 2B. When the counter 15 has counted 262 horizontal sync pulses in the third field, the recording of the third field is interrupted by the gate circuit 10 so that the ending point also coincides with that of the first field.

In a similar manner to that described above, the starting points and ending points in recording coincide with each other (in the radial direction of the magnetic disk as shown in FIG. 2B in all of the tracks.

In reproduction the motor 13 is normally rotated at the period $T_1$; the magnetic record-reproduce head 12 is switched to the reproduce or display mode; and the magnetic disk 11 is rotated. In this case, the servo signal may be applied to the motor 13 from the head $H_1$ so as to rotate the motor 13 at the period $T_1$. In the instant embodiment, the magnetic head is displaced to the next recording track during the even-numbered fields so that in reproduction, the magnetic head is also displaced to the next track during the even-numbered fields. The television signal is reproduced from the first track, next from the third track and so on and the sync pulses are not deviated. Even when the head is moved in the reversed direction, the pictures are reversed in completely synchronized manner because the starting and ending points of all fields coincide with each other.

From the foregoing description it is noted that the summation of the periods $T_1$ and $T_2$ coincides with the duration of each frame recorded on the circular track so that the starting points and ending points exactly coincide with each other in all fields so that the video signal recording and reproducing system in accordance with the present invention can record and reproduce pictures without any distortion and can reverse the sequence of the pictures to the reproduced.

In the instant embodiment, the number of scanning lines has been described as being 525 lines, but it is understood that the system may also record and reproduce a television signal in which the sync pulse of the even-numbered field is out of phase relative to that of the odd-numbered field. In addition, the magnetic record-reproduce head has been described as being displaced in recording and reproducing, but it is understood that the magnetic head may be a multi-head whose head elements are electronically switched from one to another.

In the instant embodiment, the counter has been described as starting the counting in response to a signal generated by stepping down to one half in frequency the vertical sync pulse in the television signal, but it is understood that when the frequency division ratio is varied and a required number of flip-flops are added in the frequency divider 7 and the gate signal generating circuit, faster recording becomes possible. For example when one more flip-flop is added in the frequency divider 7, the frequency division ratio becomes one-fourth so that the system can record the first, 4th 7th 10th fields and so on.

In addition, instead of the magnetic disk, a magnetic drum may be used. In this case the magnetic drum should be light in weight so that it may be rotated at a high rotational speed of 60 rpm by a small motor.

Furthermore, the number of magnets in the disk 21 has been described as being the same as the number of horizontal sync pulses in one field, but it is understood that the number of magnets may be varied by suitably selecting a number of reference signal pulses generated by the circuit 19 in synchronism with the horizontal sync pulses in the television signal.

We claim:

1. In a video signal recording system for recording upon circular tracks of an endless magnetic recording medium a television signal consisting of synchronizing pulses and video signals in which the horizontal synchronizing pulses in first fields are out of phase relative with those in second fields, a video signal recording system comprising a. television signal sampling means for sampling the television signal of each first field to be recorded upon the circular track of the endless magnetic recording medium in such a way that at least the horizontal synchronizing pulse phase difference component may be cut off at the end of said first field to be recorded, thereby to define a sampling interval, b. recording means for recording the sampled television signal of one field on each of the circular tracks of the endless magnetic recording medium, c. driving means for rotating the endless magnetic recording medium at a period equal to the sampling interval, d. speed control means connected to said recording medium driving means for varying the rotational period of said driving means in such a way that the rotational period of said driving means may be increased by about two times the phase difference between the horizontal sync pulses of the first sampled, and the second, not-sampled, field during the duration of each of said second not-sampled field between each said first sampled field, whereby the starting points of the recording of said first, sampled, fields upon the circular tracks on the endless magnetic recording medium may coincide to occupy the same place in space.

2. A video signal recording system according to claim 1 wherein said sampling means includes a. a counter for counting the horizontal synchronizing pulses in each field of the television signal, said counter being reset upon counting said horizontal synchronizing pulses in each field, b. sampling signal generating means coupled to said counter which is set by the vertical synchronizing pulse in the television signal and is reset by the reset output of said counter, and c. transmission gate means coupled to said sampling signal generating means for permitting the transmission of the television signal for a predetermined time interval in response to the output of said sampling pulse generating means.

3. A video signal recording system according to claim 1 wherein said speed control means includes a. pulse generating means for generating during one rotation of the endless magnetic recording medium control pulses the number of which is greater than the number of horizontal synchronizing pulses in each of said sampled fields by at least one pulse, and b. phase comparator means coupled to said pulse generating means for comparing the phase of the reference signal corresponding to the horizontal synchronizing pulse in the television signal with the phase of said control pulses generated by said pulse generating means, and generating the output which corresponds to the phase difference between said reference signal and control pulses, said phase comparator means imparting the additional energy to said driving means so as to vary the rotational speed of said endless magnetic recording medium in such a way that the rotational period of the endless magnetic recording medium may be increased by at least two times said phase difference between said horizontal synchronizing pulses when there exits said phase difference output.

4. A video signal recording system according to claim 3 wherein said pulse generating means includes a. first and second groups of pulse generating elements which are arrayed around the circles and rotated in unison with the endless magnetic recording medium, the number of said first group of pulse generating elements being equal to the number of horizontal synchronizing pulses in each field of the television signal and the number of said second group of pulse generating elements being different from said number of said first group of pulse generating elements by at least one, b. first and second sensing heads disposed in opposed relation with said first and second groups of pulse generating elements respectively for sensing said pulse generating elements so as to generate electrical signals, c. frequency division means for stepping down the vertical synchronizing pulse frequency by one half, and d. switching means connected to said frequency division means for alternately conducting first and second output lines in response to the signals from said frequency division means, said first and second output lines being connected to said first and second sensing heads respectively, said switching means being also connected to said phase comparator means, whereby said endless magnetic recording medium may be rotated in response to the pulses generated by said first and second groups of pulse generating elements for recording the sampled field of the television signal.

5. A video signal recording system according to claim 4 wherein the pulse generating elements of said second group are disposed in non-uniformly spaced apart relation with each other in the sections corresponding to the starting point and intermediate section of the circular recording track of said endless magnetic recording medium, whereby the rotational period of the endless magnetic recording medium may be varied so as compensate for the inertia thereof.

6. In a video signal recording system for recording upon an endless magnetic recording medium selected television signals corresponding to predetermined fields including the video signal and synchronizing signals of said fields, the horizontal synchronizing pulses in each field of the television signal being out of phase, a video signal recording system, comprising a. television signal sampling means including sampling signal generating means for sampling the video signals in a predetermined sequence in response to the vertical synchronizing pulses in said synchronizing pulses in the television signal, said television signal sampling means sampling in response to the sampling signal from said sampling signal generating means the television signal including the video signals of the predetermined fields and the associated synchronizing pulses of the predetermined fields, b. recording means coupled to said sampling means for recording upon the circular tracks on the magnetic recording medium the television signal of the predetermined fields sampled by said sampling means, c. driving means for driving the magnetic recording medium relative to said recording means at a rotational period less than a duration of each field, and d. control means coupled to said driving means for varying the driving speed of said driving means, said control means including i. first pulse generating means for generating two kinds of control pulse trains having different numbers of pulses respectively during said rotational period of said magnetic recording medium which is driven with respect to said recording means ii. frequency division means for stepping down into one half the vertical synchronizing pulse frequency in the television signal, iii. switching means coupled to said pulse generating means and to said frequency division means for outputting either of said two kinds of pulse trains in response to the signal from said frequency division means, iv. second pulse generating means for generating pulses having the same pulse period and pulse duration or width with those of one of said two kinds of pulse trains generated by said first pulse generating means, and v. comparator means coupled to said switching means and to said second pulse generating means for comparing the period of the relative displacement between said magnetic recording medium and said recording means and the phases of the pulses from said switching circuit and said second pulse generating circuit, said control means being interconnected between said comparator means and said drive means for imparting to said driving means the energy corresponding to the output from said comparator means so as to vary said relative speed between said magnetic recording medium and said recording means, thereby coinciding the starting points of the respective recordings of respective fields of the television signal to be sampled and recorded upon the magnetic recording medium.

7. A video signal recording system according to claim 6 wherein a. said driving means drives the magnetic recording medium at a period shorter than a duration of each field of the television signal, and b. said first pulse generating means in said control means includes i. first and second disks drivingly coupled to said drive means so as to rotate at the same rotational period as the magnetic recording medium, a plurality of pulse signal generating elements being disposed around the periphery of each of said first and second disks, the number of said pulse signal generating elements disposed in said first disk being different from that of said pulse signal generating elements in said second disk, and ii. sensing means disposed in opposed relation with respect to said peripheries of said first and second disks for sensing said pulse signal generating elements thereof so as to generate the control pulses.

8. A video signal recording system according to claim 7 wherein said pulse signal generating elements on said first disk are disposed in equiangularly spaced apart relation, and said pulse signal generating elements on said second disk corresponding to the starting point of the magnetic recording medium are spaced apart from each other by a distance equal to the spacing between the pulse signal generating elements on said first disk, and those corresponding to the intermediate portion or section of said magnetic recording medium are spaced apart from each other by a distance shorter than said spacing between said pulse signal generating elements on said first disk, so that the rotational period of the magnetic recording medium may be delayed so as to compensate the inertia thereof.

9. A video signal recording system according to claim 7 wherein said frequency division circuit comprises a flip-flop, and said switching means comprises a pair of logic AND gate means connected to said sensing means and said flip-flop.

10. A video signal recording system according to claim 7 wherein said pulse signal generating elements arrayed on said first disk are equal in number to the horizontal synchronizing pulses in each field of the television signal, and said second pulse generating means generates the control pulses which are substantially identical to the horizontal synchronizing pulses.

* * * * *